(12) United States Patent
Larsson et al.

(10) Patent No.: US 9,864,895 B1
(45) Date of Patent: Jan. 9, 2018

(54) FINGERPRINT SENSING SYSTEM WITH FINGER DETECT

(71) Applicant: Fingerprint Cards AB, Göteborg (SE)

(72) Inventors: Andreas Larsson, Herrljunga (SE); Frank Riedijk, Delft (NL); Hans Thörnblom, Kungsbacka (SE)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

(21) Appl. No.: 15/464,582

(22) Filed: Mar. 21, 2017

(30) Foreign Application Priority Data

Jul. 7, 2016 (SE) ...................................... 1651013

(51) Int. Cl.
*G06K 9/00* (2006.01)

(52) U.S. Cl.
CPC ....... *G06K 9/0002* (2013.01); *G06K 9/00087* (2013.01)

(58) Field of Classification Search
USPC ........ 1/1; 178/18.01, 18.03, 18.05; 324/662; 382/124
See application file for complete search history.

(56) References Cited

U.S. PATENT DOCUMENTS

| | | | | |
|---|---|---|---|---|
| 6,501,284 B1 * | 12/2002 | Gozzini | ............... | G06K 9/0002 324/662 |
| 7,864,992 B2 * | 1/2011 | Riedijk | ................ | G06K 9/0002 382/124 |
| 8,031,046 B2 | 10/2011 | Franza et al. | | |
| 8,305,358 B2 * | 11/2012 | Klinghult | .............. | G06F 3/0414 178/18.05 |
| 9,007,322 B1 * | 4/2015 | Young | ................... | G06F 3/0418 178/18.03 |
| 9,030,421 B2 * | 5/2015 | Tseng | .................... | G06F 3/0418 178/18.01 |
| 9,304,643 B2 * | 4/2016 | Jordan | .................... | G06F 3/044 |
| 9,383,876 B2 * | 7/2016 | Riedijk | .................... | G06F 3/044 |
| 9,449,212 B2 * | 9/2016 | Riedijk | ................ | G06K 9/0002 |
| 9,460,576 B2 * | 10/2016 | Riedijk | ............. | G07C 9/00158 |

(Continued)

FOREIGN PATENT DOCUMENTS

| | | |
|---|---|---|
| EP | 2 650 823 | 10/2013 |
| JP | 2008-73072 | 4/2008 |
| WO | WO 2008/007372 | 1/2008 |

OTHER PUBLICATIONS

Swedish Search Report from Swedish Application No. 1651013-3, dated Feb. 27, 2017.

*Primary Examiner* — Xuemei Chen
(74) *Attorney, Agent, or Firm* — RMCK Law Group PLC

(57) ABSTRACT

The present invention relates to a method of sensing a fingerprint pattern of a finger using a fingerprint sensing device. The method comprising: controlling a group of sensing elements to change a potential of a group of sensing structures comprised in said group of sensing elements; acquiring, in response to said variation in potential, a response signal from a finger detecting circuitry indicative of the capacitive coupling between the group of sensing structures and the finger detecting structure; comparing a variation in the response signal with a predefined threshold value; and providing a signal indicating that a finger is present when the variation in response signal is greater than the threshold value. The invention also relates to a corresponding fingerprint sensing device.

13 Claims, 7 Drawing Sheets

(56) References Cited

U.S. PATENT DOCUMENTS

| | | | | |
|---|---|---|---|---|
| 9,489,559 B2* | 11/2016 | Weber | ............... | G06K 9/0002 |
| 9,582,704 B2* | 2/2017 | Jagemalm | ............... | H01L 24/09 |
| 9,589,171 B1* | 3/2017 | Larsson | ............... | G06K 9/0002 |
| 9,600,705 B2* | 3/2017 | Riedijk | ............... | G06K 9/0002 |
| 9,600,707 B1* | 3/2017 | Ramberg | ............... | G06F 3/045 |
| 9,684,812 B2* | 6/2017 | Riedijk | ............... | G06K 9/0002 |
| 2008/0196945 A1* | 8/2008 | Konstas | ............... | G06F 3/03547 |
| | | | | 178/18.03 |
| 2010/0328255 A1 | 12/2010 | Ishizaki et al. | | |
| 2015/0015537 A1 | 1/2015 | Riedijk et al. | | |
| 2015/0071511 A1 | 3/2015 | Wang | | |
| 2016/0042216 A1 | 2/2016 | Yang et al. | | |
| 2016/0307020 A1* | 10/2016 | Zhang | ............... | G06K 9/0002 |
| 2016/0358006 A1* | 12/2016 | Zhan | ............... | G06K 9/0002 |
| 2017/0098109 A1* | 4/2017 | Carling | ............... | G06K 9/001 |
| 2017/0177138 A1* | 6/2017 | Orlovsky | ............... | G06F 3/044 |

\* cited by examiner

FINGERPRINT SENSING SYSTEM WITH FINGER DETECT

CROSS-REFERENCE TO RELATED APPLICATION

The present application is based on and claims the benefit of Swedish patent application Serial No. 1651013-3, filed Jul. 7, 2016, the content of which is hereby incorporated by reference in its entirety.

FIELD OF THE INVENTION

The present invention relates to a method of sensing a fingerprint pattern of a finger using a fingerprint sensing device. The invention further relates to a corresponding fingerprint sensing device and a computer program product.

BACKGROUND OF THE INVENTION

Various types of biometric systems are used more and more in order to provide for increased security and/or enhanced user convenience. In particular, fingerprint sensing systems have been adopted in, for example, consumer electronic devices, thanks to their small form factor, high performance and user acceptance.

To provide for a low energy consumption of the fingerprint sensing system, the fingerprint sensing system should only operate when there is a finger on the fingerprint sensing device comprised in the fingerprint sensing system. On the other hand, the fingerprint sensing system may be required to independently determine whether or not a finger is present on the sensing device and to sense the fingerprint pattern of the finger when the finger is placed on the sensing device.

U.S. Pat. No. 8,031,046 discloses a finger sensing device in which finger sensing electrodes may be bussed together and connected to a bussed electrode amplifier which is typically maintained on. A sample and hold and decoder circuit is connected to the bussed electrode amplifiers and may output an average power from the bussed group of electrodes that is compared with a threshold level. If the average power is higher than the threshold level, it is determined that the finger is present, and a fingerprint image is acquired.

Although the solution proposed by U.S. Pat. No. 8,031,046 seems to provide for a rather energy-efficient finger detect functionality, there still appears to be room for improvement.

SUMMARY

In view of above-mentioned and other drawbacks of the prior art, it is an object of the present invention to provide an improved fingerprint sensing device and method of sensing a fingerprint pattern, in particular providing for more energy efficient operation of the fingerprint sensing device.

According to a first aspect of the present invention, it is therefore provided a method of sensing a fingerprint pattern of a finger using a fingerprint sensing device comprising: an array of sensing elements for sensing the fingerprint pattern, each sensing element comprising a sensing structure for capacitive coupling with the finger; an electrically conductive finger detecting structure arranged adjacent to the array of sensing elements; and finger detecting circuitry connected to the finger detecting structure for providing a finger detection signal indicative of a capacitive coupling between a group of sensing structures and the finger detecting structure, wherein the method comprises the steps of: controlling the group of sensing elements to change a potential of the group of sensing structures comprised in the group of sensing elements; acquiring, in response to the variation in potential, a response signal from the finger detecting circuitry indicative of the capacitive coupling between the group of sensing structures and the finger detecting structure; comparing a variation in the response signal with a predefined threshold value and providing a signal indicating that a finger is present when the variation in response signal is greater than the threshold value.

The variation in response signal is caused by the presence of a finger on or near the finger detecting structure and the sensing structure. Thus, the presence of the finger causes an increase or decrease in the capacitive coupling between the finger detecting structure and the group of sensing structures.

The sensing elements may, for example, be capacitive sensing elements, each providing a measure indicative of the capacitive coupling between that particular sensing element and a finger surface touching the sensor surface. Sensing elements at locations corresponding to ridges in the fingerprint will exhibit a stronger capacitive coupling to the finger than sensing elements at locations corresponding to valleys in the fingerprint.

However, the various embodiments of the present invention are not limited to a fingerprint sensing device comprising sensing elements utilizing a particular fingerprint sensing technology, but are equally applicable to, for instance, optical, thermal or piezo-electric fingerprint sensors etc.

The fingerprint sensor may comprise additional circuitry for operating on the sensing signals indicative of the fingerprint pattern provided by the sensing elements. Such additional circuitry, which may for instance include sampling circuitry and analog-to-digital conversion circuitry. Thus, the fingerprint sensor may thus provide a fingerprint pattern signal as a digital signal. Alternatively, the fingerprint pattern signal may be provided as an analog signal.

For example, the signals may be analog or digital values indicative of a voltage, which may in turn be proportional to the capacitance of the capacitor constituted by the finger (or other conductive object in the vicinity of the finger detecting structure), the finger detecting structure and the dielectric material there between.

The sensed fingerprint pattern may be used for various purposes, such as biometric enrollment or authentication, or fingerprint pattern based navigation etc.

The threshold value may for example be determined by the coupling strength between the finger and the sensing structures such that the threshold value is indicative of a fraction of the coupling strength. Note that this is only an example and there may be other ways of setting the threshold value appropriate for a specific implementation.

The present invention is based upon the realization that a low-power finger detection on fingerprint sensors is needed and that this can be achieved in a way that the fingerprint sensing elements is not in an active mode for acquiring an image. In other words, the sensing elements can be operated in a low power mode to save power for the overall fingerprint sensing device. This is carried out by changing the potential of a group of sensing structures and monitoring the capacitive coupling with finger detecting structures.

An advantage of changing the potential of a group of sensing structures instead of the finger detecting structures is that the power consumption of the using the sensing elements for sensing the finger and thus provide the finger detection signal is relatively high compared to using the finger detecting structures for doing the same.

Furthermore, the finger detecting structures may be used for detecting that the finger is correctly placed on the fingerprint sensing structures for fingerprint pattern sensing.

According to an embodiment, the method may further comprise activating, when the variation in response signal is greater than the threshold value, at least a subset of the sensing elements to sense at least a portion of the fingerprint pattern. Thus, when it is determine that a finger is present on the fingerprint sensing device, the fingerprint pattern may be sensed. Advantageously, this reduces the number of false attempts to sense a fingerprint pattern.

To further reduce the number of false attempts to sense a fingerprint pattern, it may be required that the step of activating is only carried out when the step of activating is only carried out when the variation in the response signal is greater than the threshold value. This advantageously reduces false activation of the sensing elements and thus reduces power consumption further. In some embodiments the response signal is required to be greater than the threshold value for a time duration longer than a predefined time duration In one embodiment, it may be included to evaluate the response signal to determine a background capacitive coupling between the group of sensing structures and the finger detecting structure when a finger is not coupled to the finger detecting structure, wherein the predefined threshold value is indicative of the background capacitive coupling. This advantageously reduces the influence of e.g. dielectrics on the sensor array surface. Furthermore, it provides a lowest reference level for determining the presence of a finger.

According to an embodiment of the invention, the fingerprint sensing device may comprise at least two electrically conductive finger detecting structures, wherein the response signal is indicative of the capacitive coupling between the group of sensing elements and a first finger detecting structure, and wherein a second group of sensing elements neighboring to a second finger detecting structure are at least partly inactive, wherein the method comprises: acquiring, a second response signal from the finger detecting circuitry of the second finger detecting structure; and providing a response signal from which the second response signal has been subtracted. The at least partly inactive sensing elements may be disabled such that they are not ready for fingerprint pattern sensing. In this way, there should in principle not be any signal measured from the second finger detecting structure since the coupling between the group of sensing structures and the second finger detecting structure will be relatively weak. However, the signal that may still be measureable on the second finger detecting structure may be external noise common to the entire fingerprint sensing device, but subtracting this second signal from the response signal acquired from the first finger detecting structure, the noise may be reduced and the detection of the finger may become more accurate.

In a further embodiment, the fingerprint sensing device may comprise at least two electrically conductive finger detecting structures, wherein the response signal is indicative of the capacitive coupling between the group of sensing elements and a first finger detecting structure, wherein a second group of the sensing elements close to a second finger detecting structure are at least partly inactive, wherein the method may comprise: acquiring, a second signal from the finger detecting circuitry of the second finger detecting structure; and discarding the response signal when the second signal is greater than a background threshold level, whereby a further response signal is acquired. This further reduces the number of false triggering events since a signal may indicate detecting of other objects (e.g. a key in a pocket of a user's trousers, or jacket) than a finger.

In yet another embodiment, the group of sensing structures and the electrically conductive finger detecting structure may be separated from each other such that the capacitive coupling between the group of sensing structures and the finger detecting structure is relatively low when no finger is present and relatively high when a finger is present, wherein the threshold level is indicative of the relatively low capacitive coupling. For example, the group of sensing elements may be an island surrounded by at least partly inactive sensing elements. Thus, the group of sensing elements is then separated from the finger detecting structure by the at least partly inactive sensing elements.

According to a second aspect of the present invention there is provided a fingerprint sensing device comprising: an array of sensing elements for sensing the fingerprint pattern, each sensing element comprising a sensing structure for capacitive coupling with the finger; an electrically conductive finger detecting structure arranged adjacent to the array of sensing elements; and finger detecting circuitry connected to the finger detecting structure for providing a finger detection signal indicative of a capacitive coupling between a group of sensing structures and the finger detecting structure, wherein the fingerprint sensing device is configured to: control the group of sensing elements to change a potential of the group of sensing structures comprised in the group of sensing elements; acquire, in response to the change in potential, a response signal from the finger detecting circuitry indicative of the capacitive coupling between the group of sensing structures and the finger detecting structure; compare a variation in the response signal with a predefined threshold value; and provide a signal indicating that a finger is present when the variation in the response signal is greater than the threshold value.

According to an embodiment, the fingerprint sensing device may comprise at least two finger detecting structures, wherein the response signal is indicative of the capacitive coupling between the group of sensing elements and a first of the finger detecting structures, wherein a second group of sensing elements neighboring to a second finger detecting structure are at least partly inactive, wherein the fingerprint sensing device is configured to: acquire, a second response signal from the finger detecting circuitry of the second finger detecting structure; and provide a response signal from which the second response signal has been subtracted.

According to another embodiment, the fingerprint sensing device comprises at least two finger detecting structures, wherein the response signal is indicative of the capacitive coupling between the group of sensing elements and a first of the finger detecting structures, wherein a second group of the sensing elements close to a second finger detecting structure are at least partly inactive, wherein the fingerprint sensing device is configured to: acquire, a background signal from the finger detecting circuitry of the second finger detecting structure; and when the background signal is greater than a background threshold level, discard the response signal, whereby a further response signal is acquired.

In yet another embodiment, the group of sensing structures and the electrically conductive finger detecting structure may be separated from each other such that the capacitive coupling between the group of sensing structures and the finger detecting structure is relatively low when no finger is present and relatively high when a finger is present.

For example, in one embodiment, the group of sensing structures may be surrounded in a sensing structure plane by at least partly inactive sensing structures.

In a further embodiment, the electrically conductive finger detecting structure may be arranged to extend around the circumference of the array of sensing structures.

Further embodiments of, and effects obtained through this second aspect of the present invention are largely analogous to those described above for the first aspect of the invention.

There is further provided an electronic device comprising: a control unit; and a fingerprint sensing device. The fingerprint sensing device may be a capacitive fingerprint sensor. The electronic device may be a mobile phone, but may also be e.g. a desktop computer, tablet etc.

There is further provided a computer program product comprising a computer readable medium having stored thereon computer program means for controlling an electronic device, the electronic device comprising a control unit, a fingerprint sensor device comprising: an array of sensing elements for sensing the fingerprint pattern, each sensing element comprising a sensing structure for capacitive coupling with the finger; an electrically conductive finger detecting structure arranged adjacent to the array of sensing elements; and finger detecting circuitry connected to the finger detecting structure for providing a finger detection signal indicative of a capacitive coupling between a group of sensing structures and the finger detecting structure, wherein the computer program product comprises: code for controlling the group of sensing elements to change a potential of the group of sensing structures comprised in the group of sensing elements; code for acquiring, in response to the change in potential, a response signal from the finger detecting circuitry indicative of the capacitive coupling between the group of sensing structures and the finger detecting structure; code for comparing a variation in the response signal with a predefined threshold value; and code for providing a signal indicating that a finger is present when the variation in the response signal is greater than the threshold value.

In summary, the present invention relates to a method of sensing a fingerprint pattern of a finger using a fingerprint sensing device. The method comprising: controlling a group of sensing elements to change a potential of a group of sensing structures comprised in the group of sensing elements; acquiring, in response to the variation in potential, a response signal from a finger detecting circuitry indicative of the capacitive coupling between the group of sensing structures and the finger detecting structure; comparing a variation in the response signal with a predefined threshold value; and providing a signal indicating that a finger is present when the variation in response signal is greater than the threshold value. The invention also relates to a corresponding fingerprint sensing device.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the fingerprint sensing system and method according to the present invention are mainly described with reference to a mobile phone having an integrated fingerprint sensing device. However, it should be noted that many other kinds of electronic devices may have such a fingerprint sensing device integrated, such as tablets, desktop computers, laptops etc.

Figure 1:
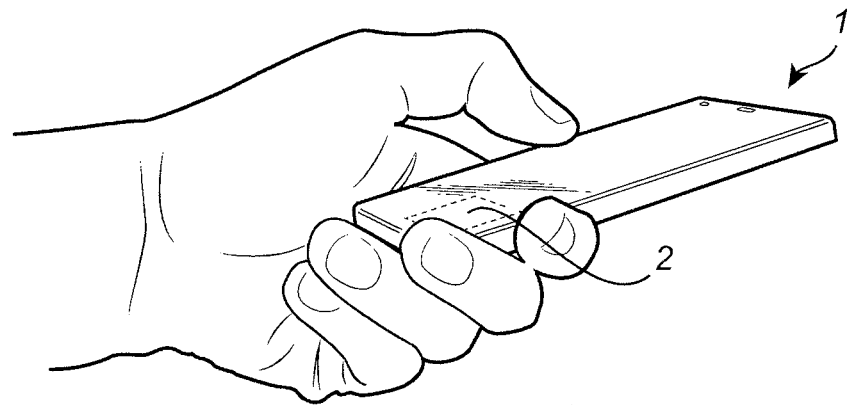
FIG. 1 schematically illustrates an application for a fingerprint sensing device according to an example embodiment of the present invention.

FIG. 1 schematically illustrates an application for a fingerprint sensing device according to an example embodiment of the present invention, in the form of a mobile phone 1 with an integrated fingerprint sensing device 2. The fingerprint sensing device 2 may, for example, be used for unlocking the mobile phone 1 and/or for authorizing transactions carried out using the mobile phone, etc.

Figure 2:
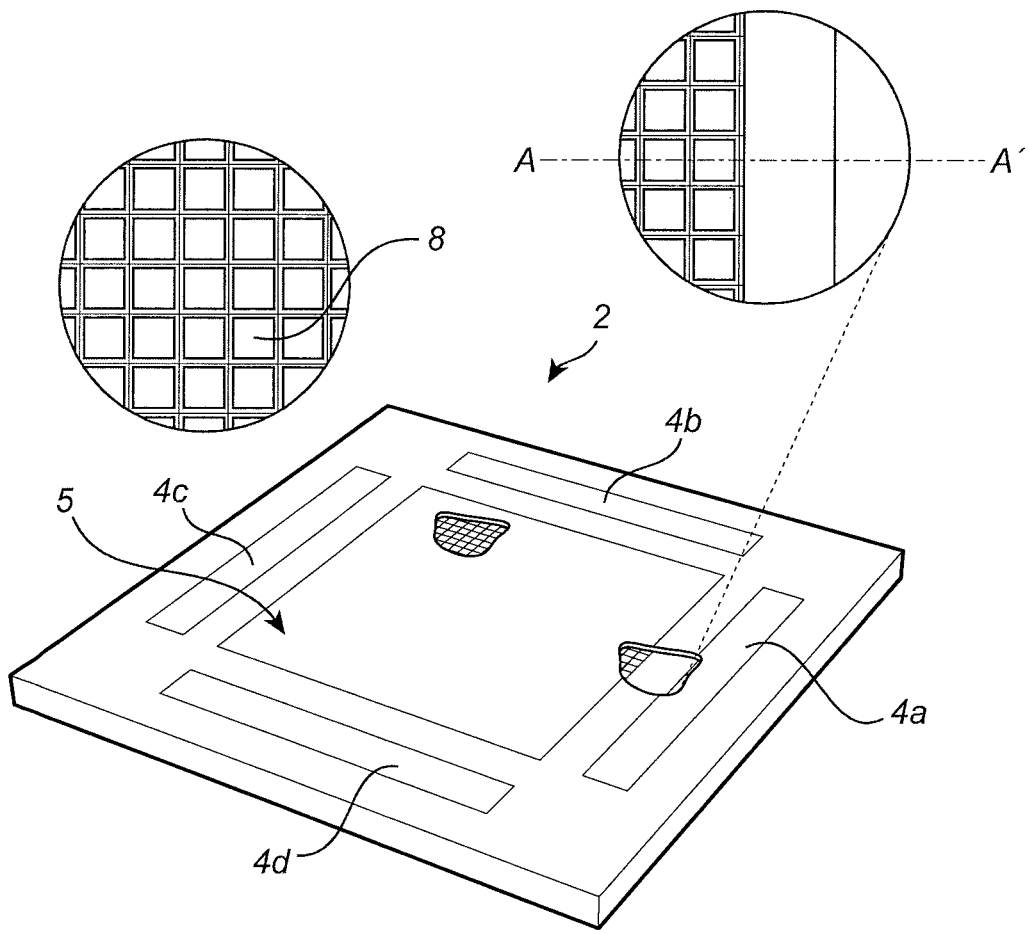
FIG. 2 schematically shows the fingerprint sensing device in FIG. 1.

FIG. 2 schematically shows the fingerprint sensing device 2 comprised in the mobile phone 1 in FIG. 1. As can be seen in FIG. 2, the fingerprint sensing device 2 comprises a sensor array 5, and finger detecting structures 4a-d. Although not shown in FIG. 2, the fingerprint sensing device 2 further comprises a power supply interface 6 and a communication interface 7. The sensor array 5 comprises a large number of sensing elements 8 (only one of the sensing elements has been indicated with a reference numeral to avoid cluttering the drawing), each being controllable to sense a distance between a sensing structure comprised in the sensing element 8 and the surface of a finger contacting the top surface of the sensor array 5.

In a battery powered electronic device, such as the mobile phone 1 in FIG. 1, keeping the energy consumption of various sub-systems, including the fingerprint sensing device 2, as low as possible is of utmost importance. In particular, the energy consumption of sub-systems that are not used during a given time period should be zero or close to zero during that time period.

Therefore, although not shown in FIG. 2, the fingerprint sensing device 2 in FIG. 2 is also provided with circuitry for determining if there is a finger present on the fingerprint sensing device and to activate the fingerprint sensing device when a finger is determined to be present so that the fingerprint sensing device can be in a very low power state between finger detection events.

Figure 3:
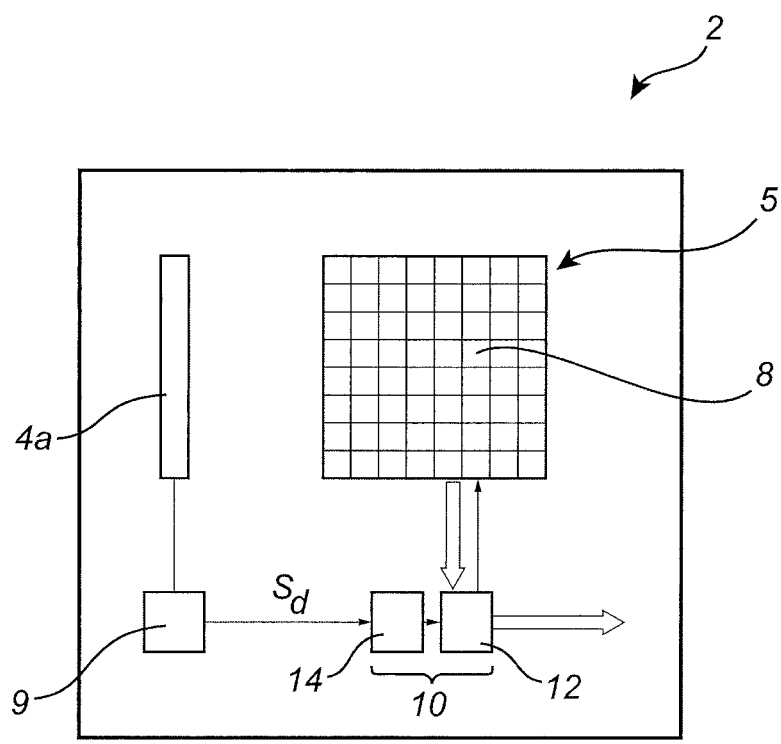
FIG. 3 is a block diagram of the fingerprint sensing device in FIG. 2.

Referring to the block diagram in FIG. 3, the fingerprint sensing device 2 comprises, in addition to the sensor array 5 and finger detecting structures 4a-d shown in FIG. 2, a finger detector circuit 9, and operation control circuitry 10 including a finger detection evaluation circuit 14 and an image acquisition control circuit 12. The finger detector circuit 9 is connected to the finger detecting structure 4a for providing a finger detection signal $S_d$ indicative of a capacitive coupling between the finger detecting structure 4a and a group of sensing structures. In FIG. 3, only one of the finger detecting structures 4a is shown. The additional finger detecting structures 4b-d may all be connected to the same finger detector circuit 9, or each finger detecting structure may be connected to its own finger detector circuit.

As is schematically shown in FIG. 3, the finger detection evaluation circuit 14 is connected to the finger detector circuit 9 and to the image acquisition control circuit 12. The image acquisition control circuit 12 is connected to the sensor array 5.

Next, an example configuration of the finger detector circuit 9 and the sensing elements 8 will be described with reference to FIG. 4.

Figure 4A:
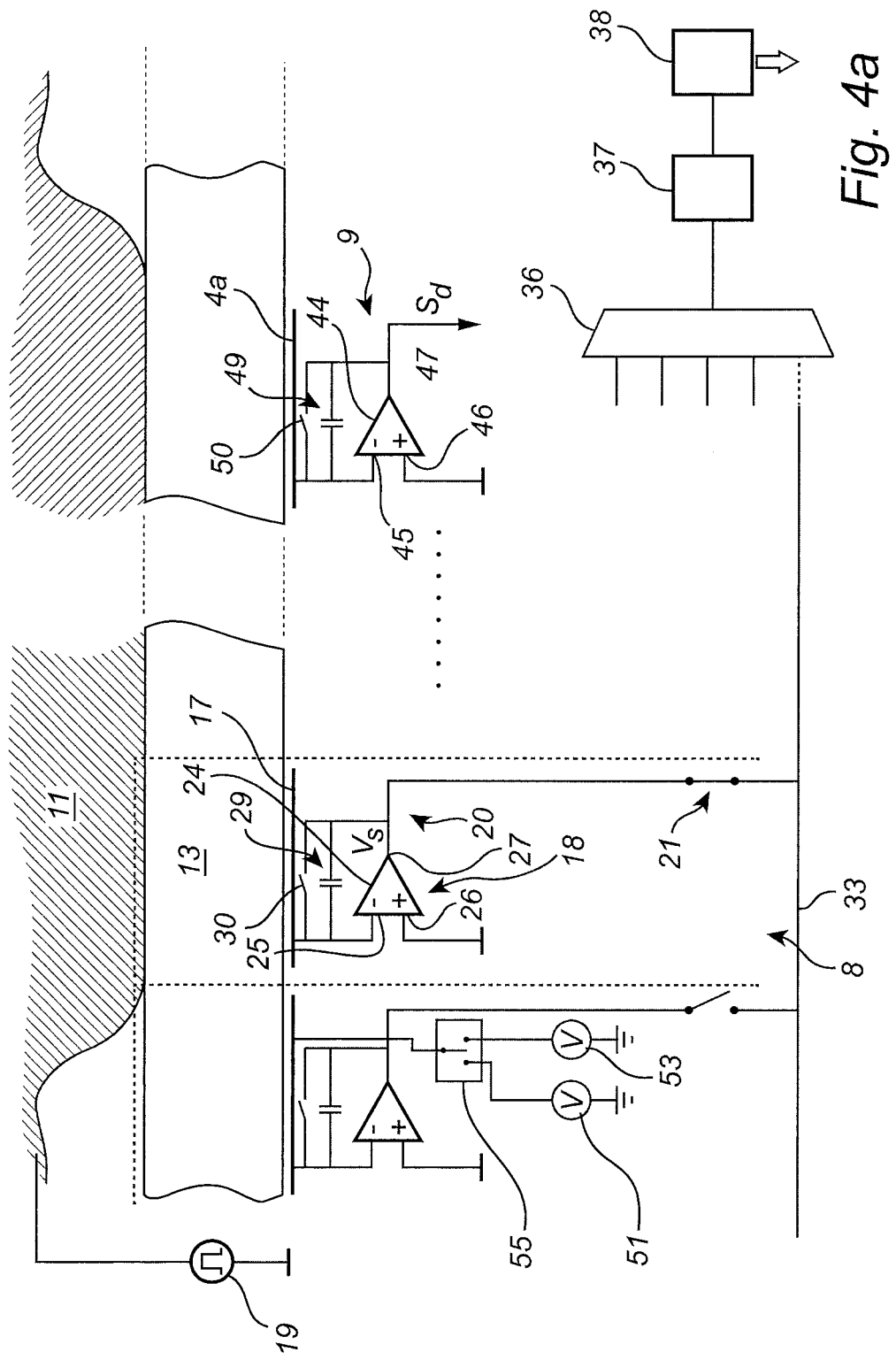
FIG. 4a is a schematic cross-section view of a portion of the fingerprint sensing device in FIG. 3.

FIG. 4a is a schematic cross section of a portion of the fingerprint sensing device 2 in FIG. 2 taken along the line A-A' as indicated in FIG. 2 with a finger 11 placed on top of a protective dielectric top layer 13 covering the sensor array 5 and the finger detecting structure 4a. Referring to FIG. 4a, the fingerprint sensing device 2 comprises an excitation signal providing circuit 19 electrically connected to the finger via a conductive finger drive structure (not shown in FIG. 4), a plurality of sensing elements 8, and a finger detection arrangement comprising the finger detecting structure 4a and a finger detection circuit 9 connected to the finger detecting structure 4a.

As is schematically indicated in FIG. 4a, each sensing element 8 comprises a conductive sensing structure, here in the form of a metal plate 17 underneath the protective dielectric top layer 13, a charge amplifier 18, and selection circuitry, here functionally illustrated as a simple selection switch 21 for allowing selection/activation of the sensing element 8.

The charge amplifier 18 comprises at least one amplifier stage, here schematically illustrated as an operational amplifier (op amp) 24 having a first input (negative input) 25 connected to the sensing structure 17, a second input (positive input) 26 connected to sensor ground or another reference potential, and an output 27. In addition, the charge amplifier 18 comprises a feedback capacitor 29 connected between the first input 25 and the output 27, and reset circuitry, here functionally illustrated as a switch 30, for allowing controllable discharge of the feedback capacitor 29. The charge amplifier 18 may be reset by operating the reset circuitry 30 to discharge the feedback capacitor 29.

As is often the case for an op amp 24 in a negative feedback configuration, the voltage at the first input 25 follows the voltage at the second input 26. Depending on the particular amplifier configuration, the potential at the first input 25 may be substantially the same as the potential at the second input 26, or there may be a substantially fixed offset between the potential at the first input 25 and the potential at the second input 26. In the configuration of FIG. 4, the first input 25 of the charge amplifier is virtually grounded.

When a time-varying potential is provided to the finger 11 by the excitation signal providing circuitry 19, a corresponding time-varying potential difference occurs between the sensing structure 17 and the finger 11.

The above-described change in potential difference between the finger 11 and the sensing structure 17 results in a sensing voltage signal $V_s$ on the output 27 of the charge amplifier 18.

When the indicated sensing element 8 is selected for sensing, the selection switch 21 is closed to provide the sensing signal to the readout line 33. The readout line 33, which may be a common readout line for a row or a column of the sensor array 5 in FIG. 2, is shown in FIG. 4 to be connected to a multiplexer 36. As is schematically indicated in FIG. 4a, additional readout lines from other rows/columns of the sensor array 5 may also be connected to the multiplexer 36.

The output of the multiplexer 36 is connected to a sample-and-hold circuit 37 and an analog-to-digital converter 38 in series for sampling and converting the analog signals originating from the sensing elements 8 to a digital representation of the fingerprint pattern of the finger 11 on the sensor 2.

As is schematically indicated in FIG. 4a, the finger detecting circuit 9 is here provided in the form of a charge amplifier similar in principle to the charge amplifier 18 comprised in the sensing element 8 described above.

Accordingly, the finger detecting circuit 9 comprises at least one amplifier stage, here schematically illustrated as an operational amplifier (op amp) 44 having a first input (negative input) 45 connected to the finger detecting structure 4a, a second input (positive input) 46 connected to sensor ground or another reference potential, and an output 47. In addition, the charge amplifier comprises a feedback capacitor 49 connected between the first input 45 and the output 47, and reset circuitry, here functionally illustrated as a switch 50, for allowing controllable discharge of the feedback capacitor 49. The charge amplifier may be reset by operating the reset circuitry 50 to discharge the feedback capacitor 49. As is also indicated in FIG. 4, the output of the finger detecting circuitry is a finger detection signal $S_d$ (in the form of a voltage) indicative of the capacitive coupling between a group of sensing structures 17 and the finger detecting structure 4a.

In FIG. 4a, the finger 11 is shown as being connected to an excitation circuit 19 for providing the desired potential difference between the finger 11, and the sensing plates 17 of the sensor array 5. It should be noted that this desired potential difference may alternatively be provided by changing the ground level of the fingerprint sensing device in relation to the ground level of the electronic device (such as mobile phone 1) in which the fingerprint sensing device 2 is included. Furthermore, the potential difference may also be provided by changing the potential of part of the sensing structures 17, i.e. also the potential of the sensing structures (or at least a portion of the sensing structures) changes.

For detecting the presence of a finger on the finger detecting structure 4a, a group of sensing elements is controlled to change a potential of the group of sensing structures comprises in the group of sensing elements. This is done by changing the potential of the sensing structures in the group of sensing elements. As an example shown in FIG. 4a this is performed by switching from a first power supply 51 connected to the sensing structures to a second power supply 53 through a switch 55. This switching may be performed by each sensing element separately or by a set of power supplies and switches for changing the potential of the entire group of sensing structures.

Figure 4B:
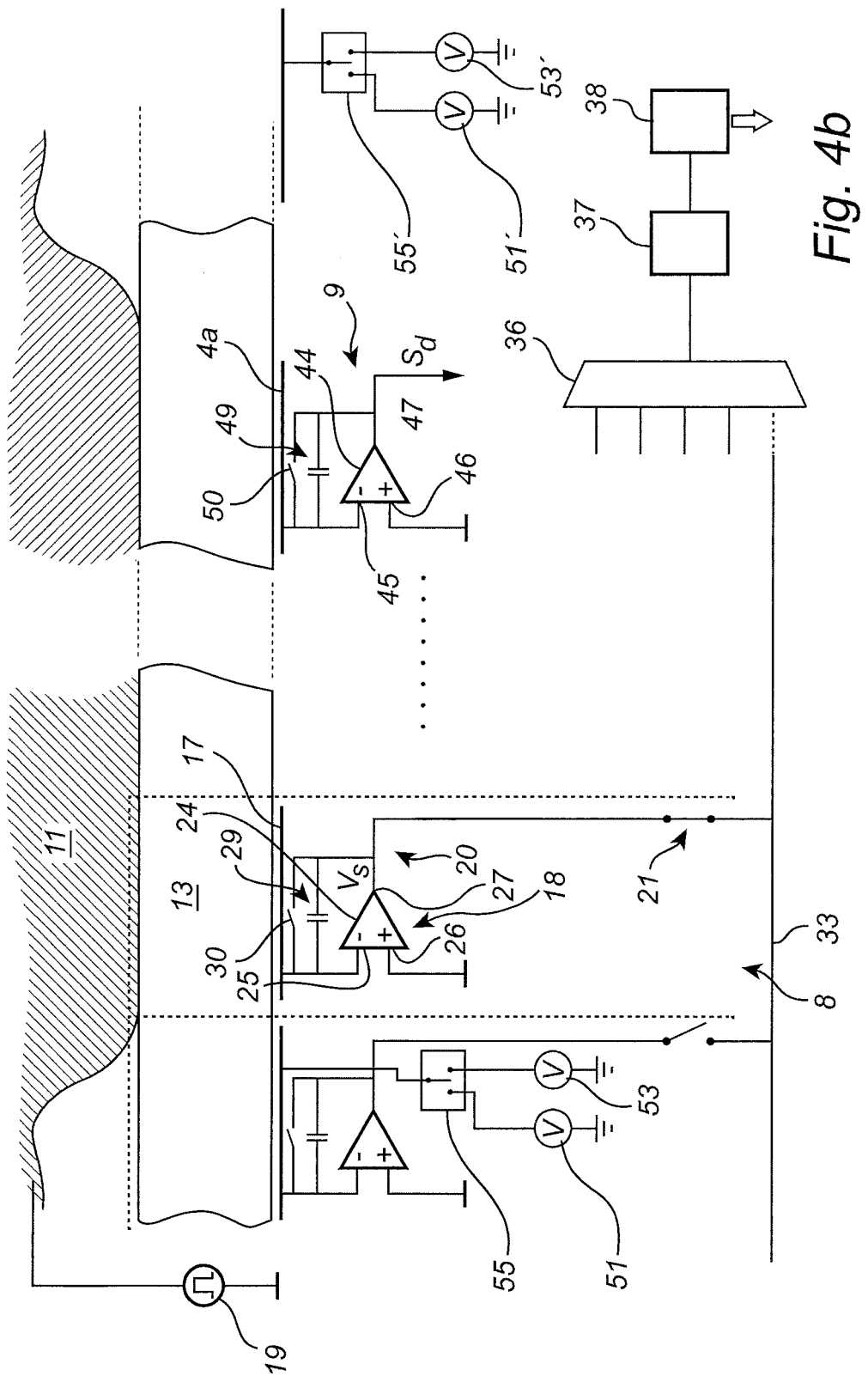
FIG. 4b is a schematic cross-section view of a portion of the fingerprint sensing device in FIG. 3.

FIG. 4b is a schematic cross section of a portion of an embodiment of a fingerprint sensing device. The difference between the embodiment shown in FIG. 4b and the one in FIG. 4a is that there is a finger excitation structure 40a connected to power supplies 51' and alternatingly to power supply 53' via a switch 55'. Note that the power supplies 51 and 53 may be the same as the power supplies 51' and 53'. For detecting the presence of a finger on the finger detecting structure 4a, a group of sensing elements and the finger excitation structure are controlled to change a potential of the group of sensing structures comprises in the group of sensing elements and a potential of the finger excitation structure. This way, the finger detecting signal may be enhanced. Each of the finger detecting structures 4a-d may have a corresponding adjacent finger excitation structure.

Figure 5:
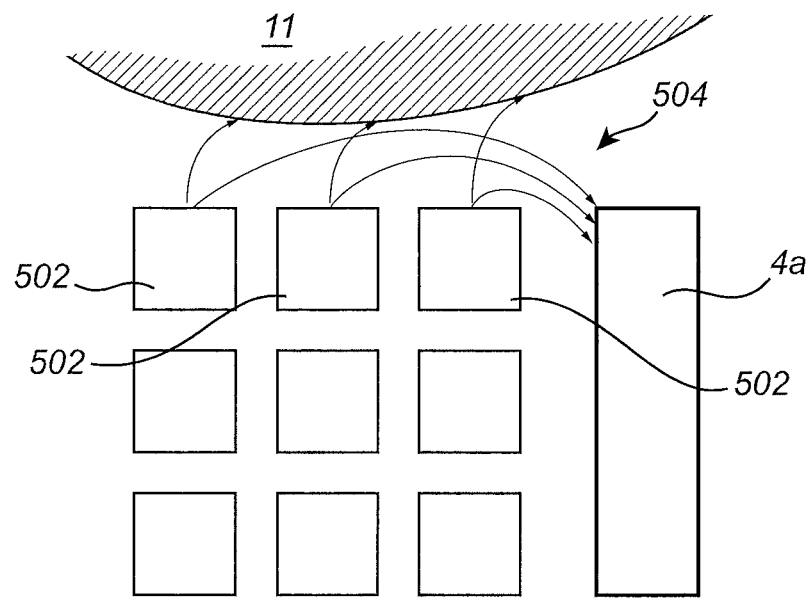
FIG. 5 conceptually illustrates the function of an embodiment of the invention.

FIG. 5 schematically shows a close up of a group of sensing structures (some denoted 502) comprised in a group of sensing elements. Fields lines 504 indicate the capacitive coupling between the finger detecting structure 4a and the sensing structures 502. As is further shown, the finger 11 interrupts some of the fields lines, thereby changing the capacitive coupling between the group of sensing structures 502 and the finger detecting structure 4a.

Figure 6:
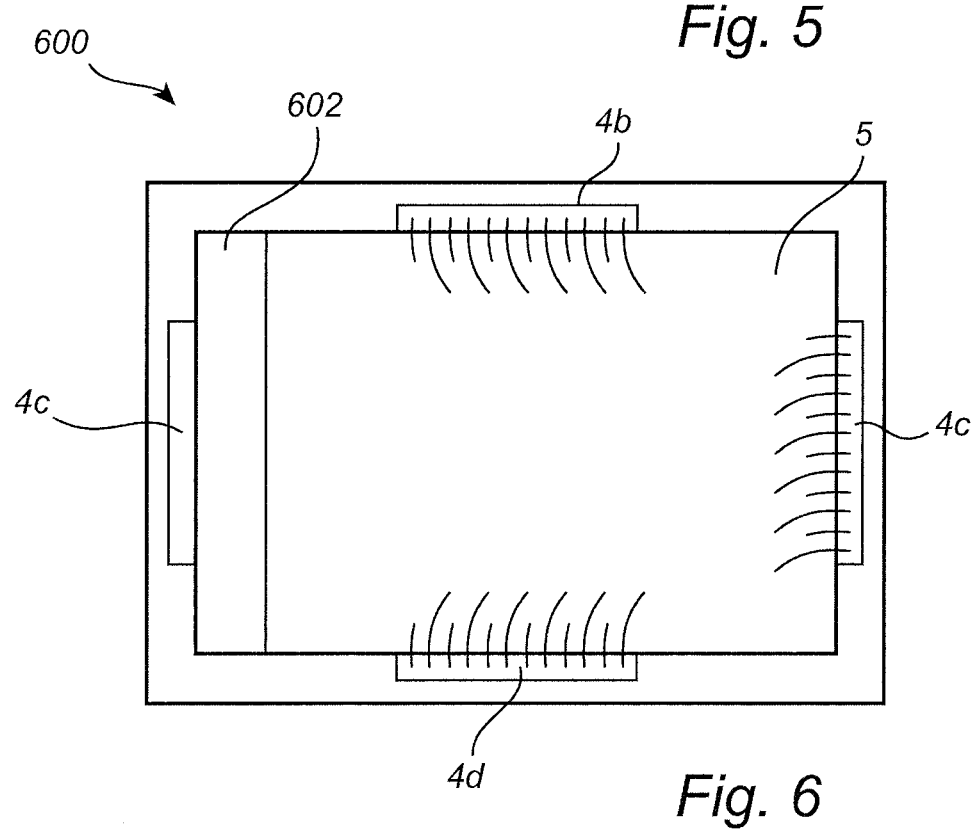
FIG. 6 conceptually shows a fingerprint sensing device according to an embodiment.

FIG. 6 schematically shows another fingerprint sensing device 600. As can be seen in FIG. 6, the fingerprint sensing device 2 comprises a sensor array 5, and finger detecting structures 4a-d. Furthermore, a second group of sensing elements 602 (individual sensing elements not shown) neighboring to a second finger detecting structure 4c is at least partly inactive. Thus, the capacitive coupling between the group of structures comprised in the sensing elements which are not disabled will only very weakly, if at all couple to the second finger detecting structure 4c. With this embodiment shown in FIG. 6, it is advantageous to acquiring a second signal from the finger detecting circuitry of the second finger detecting structure 4c and to provide a response signal from which the second response signal has been subtracted. In other words, the second response signal is used for removing background noise. Alternatively or additionally, when the second signal is greater than a background threshold level, the response signal may be discarded, whereby a further response signal may be acquired.

Figure 7:
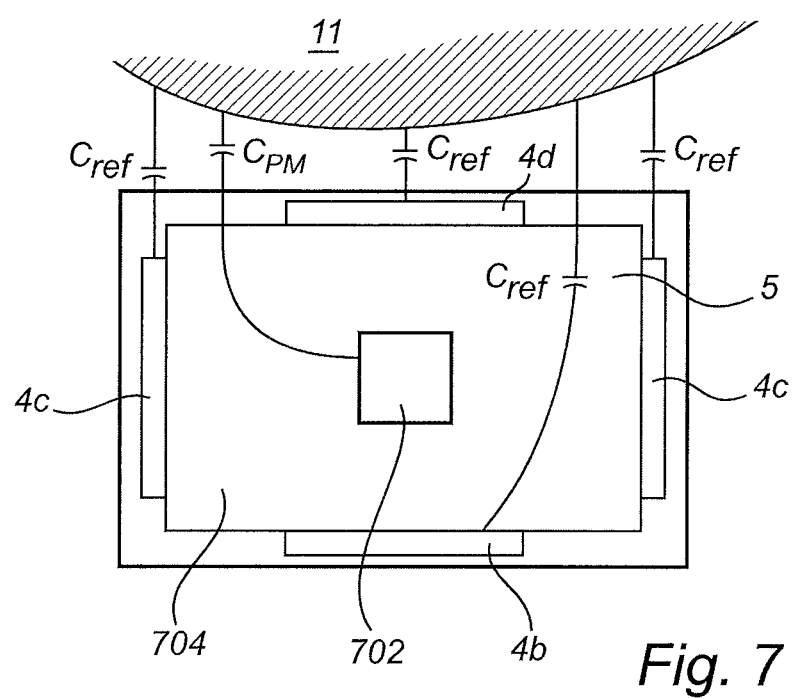
FIG. 7 conceptually shows a fingerprint sensing device according to an embodiment.

FIG. 7 schematically shows another fingerprint sensing device 700. As can be seen in FIG. 7, the fingerprint sensing device 700 comprises a sensor array 5, and finger detecting structures 4a-d. Furthermore, the group of sensing elements 702 is separated from the finger detecting structures 4a-d by disabled (or at least partly inactive) sensing elements 704. Thus, the capacitive coupling between the group of sensing elements 702 and each of the finger detecting structures 4a-d is a coupling through the finger 11 as is indicated by the capacitance $C_{ref}$ between the finger and the finger detecting structures 4a-d and the capacitance $C_{pm}$ between the finger 11 and the group of sensing elements 702. When the finger 11 is not present, there is no or close to no signal (e.g. only noise) since the coupling between the group of sensing elements 702 and each of the finger detecting structures 4a-d is relatively weak.

In a further embodiment, the finger detecting structures 4a-d are connected to each other for increasing the sensing area.

Figure 8:
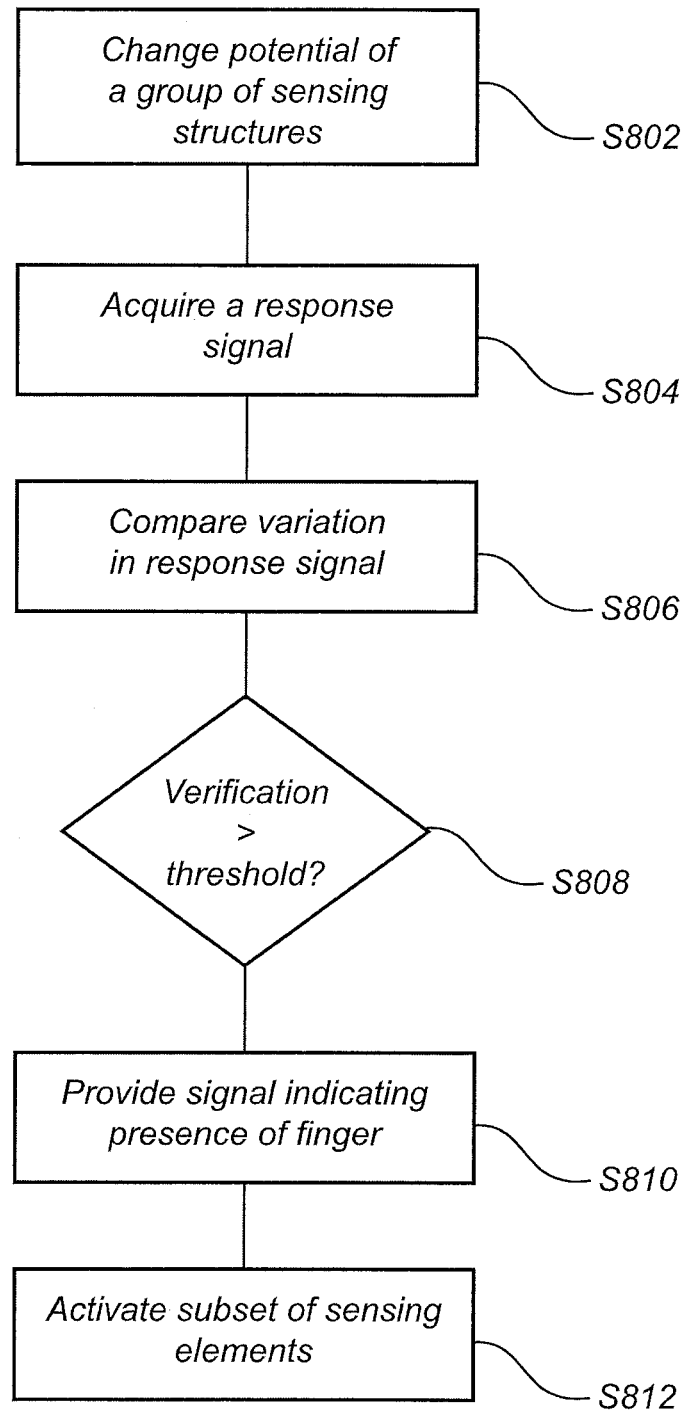
FIG. 8 is a flow-chart schematically illustrating a method according to an embodiment of the present invention.

FIG. 8 shows a flow-chart of method steps according to an embodiment of the invention. In a first step S802, controlling a group of sensing elements to change a potential of the group of sensing structures comprised in the group of sensing elements. Subsequently in step S804, acquire, in response to the variation in potential, a response signal from the finger detecting circuitry indicative of the capacitive coupling between the group of sensing structures and the finger detecting structure. Then in step S806, comparing a variation in the response signal with a predefined threshold value. When the variation in response signal is greater than the threshold value S808, providing S810 a signal indicating that a finger is present and activating S812 at least a subset of the sensing elements to sense at least a portion of the fingerprint pattern.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of sensing a fingerprint pattern of a finger using a fingerprint sensing device comprising:
   providing an array of sensing elements for sensing said fingerprint pattern, each sensing element comprising a sensing structure for capacitive coupling with the finger;
   controlling a group of sensing elements to change a potential of the group of sensing structures comprised in said group of sensing elements;
   acquiring, in response to said variation in potential, a response signal from a finger detecting circuitry connected to an electrically conductive finger detecting structure arranged adjacent to said array of sensing elements, the response signal is indicative of the capacitive coupling between the group of sensing structures and the finger detecting structure;
   comparing a variation in the response signal with a predefined threshold value; and
   providing a signal indicating that a finger is present when the variation in response signal is greater than the threshold value.

2. The method according to claim 1, further comprising:
   activating, when the variation in response signal is greater than the threshold value, at least a subset of said sensing elements to sense at least a portion of said fingerprint pattern.

3. The method according to claim 2, wherein said step of activating is only carried out when said variation in the response signal is greater than the threshold value.

4. The method according to claim 1, further comprising:
   evaluating said response signal to determine a background capacitive coupling between the group of sensing structures and the finger detecting structure when a finger is not coupled to the finger detecting structure, wherein said predefined threshold value is indicative of the background capacitive coupling.

5. The method according to claim 1, wherein said fingerprint sensing device comprises at least two electrically conductive finger detecting structures, wherein said response signal is indicative of the capacitive coupling between the group of sensing elements and a first finger detecting structure, and wherein a second group of sensing elements neighboring to a second finger detecting structure are at least partly inactive, wherein the method comprises:
   acquiring, a second response signal from the finger detecting circuitry of the second finger detecting structure; and
   providing a response signal from which the second response signal has been subtracted.

6. The method according to claim 1, wherein said fingerprint sensing device comprises at least two electrically conductive finger detecting structures, wherein said response signal is indicative of the capacitive coupling between the group of sensing elements and a first finger detecting structure, wherein a second group of the sensing elements close to a second finger detecting structure are at least partly inactive, wherein the method comprises:

acquiring, a second signal from the finger detecting circuitry of the second finger detecting structure; and discarding the response signal when the second signal is greater than a background threshold level, whereby a further response signal is acquired.

7. The method according to claim 1, wherein the group of sensing structures and the electrically conductive finger detecting structure are separated from each other such that the capacitive coupling between the group of sensing structures and the finger detecting structure is relatively low when no finger is present and relatively high when a finger is present, wherein said threshold value is indicative of the relatively low capacitive coupling.

8. A fingerprint sensing device comprising:
an array of sensing elements for sensing a fingerprint pattern, each sensing element comprising a sensing structure for capacitive coupling with a finger;
an electrically conductive finger detecting structure arranged adjacent to said array of sensing elements; and
finger detecting circuitry connected to said finger detecting structure for providing a finger detection signal indicative of a capacitive coupling between a group of sensing structures and the finger detecting structure,
wherein the fingerprint sensing device is configured to:
control a group of sensing elements to change a potential of the group of sensing structures comprised in said group of sensing elements;
acquire, in response to said change in potential, a response signal from the finger detecting circuitry indicative of the capacitive coupling between the group of sensing structures and the finger detecting structure;
compare a variation in the response signal with a predefined threshold value; and
provide a signal indicating that a finger is present when the variation in the response signal is greater than the threshold value.

9. The fingerprint sensing device according to claim 8, wherein said fingerprint sensing device comprises at least two finger detecting structures, wherein said response signal is indicative of the capacitive coupling between the group of sensing elements and a first of the finger detecting structures, wherein a second group of sensing elements neighboring to a second finger detecting structure are at least partly inactive, wherein the fingerprint sensing device is configured to:
acquire, a second response signal from the finger detecting circuitry of the second finger detecting structure; and
provide a response signal from which the second response signal has been subtracted.

10. The fingerprint sensing device according to claim 8, wherein said fingerprint sensing device comprises at least two finger detecting structures, wherein said response signal is indicative of the capacitive coupling between the group of sensing elements and a first of the finger detecting structures, wherein a second group of the sensing elements close to a second finger detecting structure are at least partly inactive, wherein the fingerprint sensing device is configured to:
acquire, a background signal from the finger detecting circuitry of the second finger detecting structure; and
when the background signal is greater than a background threshold level, discard the response signal, whereby a further response signal is acquired.

11. The fingerprint sensing device according to claim 8, wherein the group of sensing structures and the electrically conductive finger detecting structure are separated from each other such that the capacitive coupling between the group of sensing structures and the finger detecting structure is relatively low when no finger is present and relatively high when a finger is present.

12. The fingerprint sensing device according to claim 11, wherein said group of sensing structures is surrounded in a sensing structure plane by at least partly inactive sensing structures.

13. The fingerprint sensing device according to claim 8, wherein the electrically conductive finger detecting structure is arranged to extend around the circumference of the array of sensing structures.

* * * * *